United States Patent
Kean

(10) Patent No.: US 11,755,028 B2
(45) Date of Patent: Sep. 12, 2023

(54) MOBILE WORK MACHINE WITH OBJECT DETECTION USING VISION RECOGNITION

(71) Applicant: Deere & Company, Moline, IL (US)

(72) Inventor: Michael G. Kean, Maquoketa, IA (US)

(73) Assignee: Deere & Company, Moline, IL (US)

( * ) Notice: Subject to any disclaimer, the term of this patent is extended or adjusted under 35 U.S.C. 154(b) by 434 days.

(21) Appl. No.: 16/567,735

(22) Filed: Sep. 11, 2019

(65) Prior Publication Data

US 2021/0072764 A1    Mar. 11, 2021

(51) Int. Cl.
| | | |
|---|---|---|
| G06T 1/00 | (2006.01) | |
| G05D 1/02 | (2020.01) | |
| G06T 7/70 | (2017.01) | |
| G06V 10/20 | (2022.01) | |
| G06V 20/56 | (2022.01) | |

(52) U.S. Cl.
CPC .......... *G05D 1/0246* (2013.01); *G05D 1/0257* (2013.01); *G06T 7/70* (2017.01); *G06V 10/255* (2022.01); *G06V 20/56* (2022.01); *G06T 2207/10016* (2013.01); *G06T 2207/10044* (2013.01); *G06T 2207/30241* (2013.01); *G06T 2207/30261* (2013.01)

(58) Field of Classification Search
CPC ...... G05D 1/0246; G05D 1/0257; G06T 7/70; G06T 2207/10016; G06T 2207/10044; G06T 2207/30241; G06T 2207/30261
USPC .......................................................... 701/50
See application file for complete search history.

(56) References Cited

U.S. PATENT DOCUMENTS

| | | | |
|---|---|---|---|
| 7,418,318 B2 | 8/2008 | Hrabak et al. | |
| 7,984,574 B2 | 7/2011 | Pfohl et al. | |
| 8,548,680 B2 | 10/2013 | Ryerson et al. | |
| 9,463,741 B2 | 10/2016 | Fukuda et al. | |
| 10,108,867 B1 * | 10/2018 | Vallespi-Gonzalez | ....................... G06V 20/58 |
| 10,882,538 B1 | 1/2021 | Witt et al. | |
| 2006/0274147 A1 | 12/2006 | Chinomi et al. | |
| 2009/0043462 A1 * | 2/2009 | Stratton | ................ E02F 9/2033 701/50 |

(Continued)

FOREIGN PATENT DOCUMENTS

| | | |
|---|---|---|
| DE | 102012004198 | 10/2012 |
| DE | 102019114667 A1 | 12/2020 |

(Continued)

OTHER PUBLICATIONS

Non-Final Office Action for U.S. Appl. No. 16/863,398 dated Sep. 17, 2021, 19 pages.

(Continued)

*Primary Examiner* — Tyler J Lee
*Assistant Examiner* — Tiffany P Ohman
(74) *Attorney, Agent, or Firm* — Christopher J. Volkman; Kelly, Holt & Christenson PLLC

(57) ABSTRACT

A method of controlling a mobile work machine on a worksite includes receiving an indication of an object detected on the worksite, determining a location of the object relative to the mobile work machine, receiving an image of the worksite, correlating the determined location of the object to a portion of the image, evaluating the object by performing image processing of the portion of the image, and generating a control signal that controls the mobile work machine based on the evaluation.

20 Claims, 15 Drawing Sheets

(56) References Cited

U.S. PATENT DOCUMENTS

| | | | |
|---|---|---|---|
| 2012/0083982 A1* | 4/2012 | Bonefas | G05D 1/0223 |
| | | | 701/70 |
| 2014/0236477 A1* | 8/2014 | Chen | G07C 5/008 |
| | | | 701/450 |
| 2014/0247328 A1 | 9/2014 | Popham et al. | |
| 2015/0166062 A1 | 6/2015 | Johnson et al. | |
| 2015/0199847 A1 | 7/2015 | Johnson et al. | |
| 2015/0353095 A1 | 12/2015 | Freess | |
| 2016/0257341 A1 | 9/2016 | Lavoie et al. | |
| 2016/0263997 A1 | 9/2016 | Mizutani | |
| 2016/0353049 A1 | 12/2016 | Maley | |
| 2018/0022347 A1 | 1/2018 | Myers et al. | |
| 2018/0215382 A1 | 8/2018 | Gupta et al. | |
| 2019/0130188 A1* | 5/2019 | Zhou | G06V 10/87 |
| 2019/0261550 A1 | 8/2019 | Damme et al. | |
| 2020/0326713 A1 | 10/2020 | Spielman et al. | |
| 2020/0341111 A1* | 10/2020 | D'Orazio | G01S 7/41 |

FOREIGN PATENT DOCUMENTS

| | | |
|---|---|---|
| JP | 2013-142228 A | 7/2013 |
| JP | 2018156550 A | 10/2018 |
| WO | WO2019104368 A1 | 6/2019 |

OTHER PUBLICATIONS

Xu, F., Chen, L., Lou, J. and Ren, M., 2019. A real-time road detection method based on reorganized lidar data. PloS one, 14(4), p. e0215159, 17 pages.

"To Go the Distance, We Built Systems That Could Better Perceive It" (NVIDIA Blog), Jun. 19, 2019, https://blogs.nvidia.com/blog/2019/06/19/drive-labs-distance-to-object-detection/Video on YouTube is https://youtu.be/ftsUg5VIzIE (2019).

2014 Nissan Versa Around View Monitor challenge, YouTube video, Jun. 20, 2013, https://youtu.be/zLhLtM5BHfA (0:35-0:46) (2013).

"Method and System for Providing Road Steepness Overlay for Computer Generated Maps", Published: Sep. 14, 2011, 2 pages.

Application and Drawings for U.S. Appl. No. 16/863,398, filed Apr. 30, 2020, 51 pages.

Application and Drawings for U.S. Appl. No. 16/567,789 dated Sep. 11, 2019, 46 pages.

Akhavian, R. and Behzadan, A.H., 2015. Construction equipment activity recognition for simulation input modeling using mobile sensors and machine learning classifiers. Advanced Engineering Informatics, 29(4), pp. 867-877.

Damerow, F., Li, Y., Puphal, T., Flade, B. and Eggert, J., 2018. Intersection warning system for occlusion risks using relational local dynamic maps. IEEE Intelligent Transportation Systems Magazine, 10(4), pp. 47-59.

Non-Final Office Action for U.S. Appl. No. 16/567,789 dated Nov. 24, 2021, 9 pages.

Final Office Action for U.S. Appl. No. 16/567,789 dated May 25, 2022, 13 pages.

Notice of Allowance received for U.S. Appl. No. 16/863,398 dated Jun. 13, 2022, 9 pages.

Final Office Action for U.S. Appl. No. 16/863,398, dated Mar. 16, 2022, 17 pages.

German Search Report issued in application No. DE102021203109.9 dated Nov. 24, 2021 (06 pages).

Search Report for German Patent Application No. 102020210179.5 dated Jul. 15, 2022, 4 pages.

Non-Final Office Action for U.S. Appl. No. 16/567,789 dated Feb. 2, 2023, 14 pages.

* cited by examiner

MOBILE WORK MACHINE WITH OBJECT DETECTION USING VISION RECOGNITION

FIELD OF THE DESCRIPTION

The present description generally relates to object detection systems for mobile work machines. More specifically, but not by limitation, the present description relates to an object detection system for a mobile work machine that uses radar detection and vision recognition to detect objects in a rear path of the machine.

BACKGROUND

There are many different types of work machines. Those work machines can include construction machines, turf management machines, forestry machines, agricultural machines, among others. Many of these pieces of mobile equipment have controllable subsystems, that include mechanisms that are controlled by the operator in performing operations.

For instance, a construction machine can have multiple different mechanical, electrical, hydraulic, pneumatic and electro-mechanical subsystems, among others, all of which can be operated by the operator. Construction machines are often tasked with transporting material across a worksite, or into or out of a worksite, in accordance with a worksite operation. Different worksite operations may include moving material from one location to another or leveling a worksite, etc. During a worksite operation, a variety of construction machines may be used, including articulated dump trucks, wheel loaders, graders, and excavators, among others.

Worksite operations may involve a large number of steps or phases and may be quite complex. Further, the worksite operations often require precise machine control by an operator. Some maneuvers on the worksite require the operator to operate the machine in a reverse direction, to back the machine across the worksite. In doing so, there are often blind spots, or areas that are difficult for the operator to observe, even with the use of mirrors or rear vision systems such as back-up cameras. This increases the risk of undesired machine contact with objects on the worksite, such as other machines, people, worksite materials, etc.

The discussion above is merely provided for general background information and is not intended to be used as an aid in determining the scope of the claimed subject matter.

SUMMARY

A method of controlling a mobile work machine on a worksite includes receiving an indication of an object detected on the worksite, determining a location of the object relative to the mobile work machine, receiving an image of the worksite, correlating the determined location of the object to a portion of the image, evaluating the object by performing image processing of the portion of the image, and generating a control signal that controls the mobile work machine based on the evaluation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

The present description generally relates to object detection systems for mobile work machines. More specifically, but not by limitation, the present description relates to an object detection system for a mobile work machine that uses radar detection and vision recognition to detect objects in a rear path of the machine.

Figure 1:
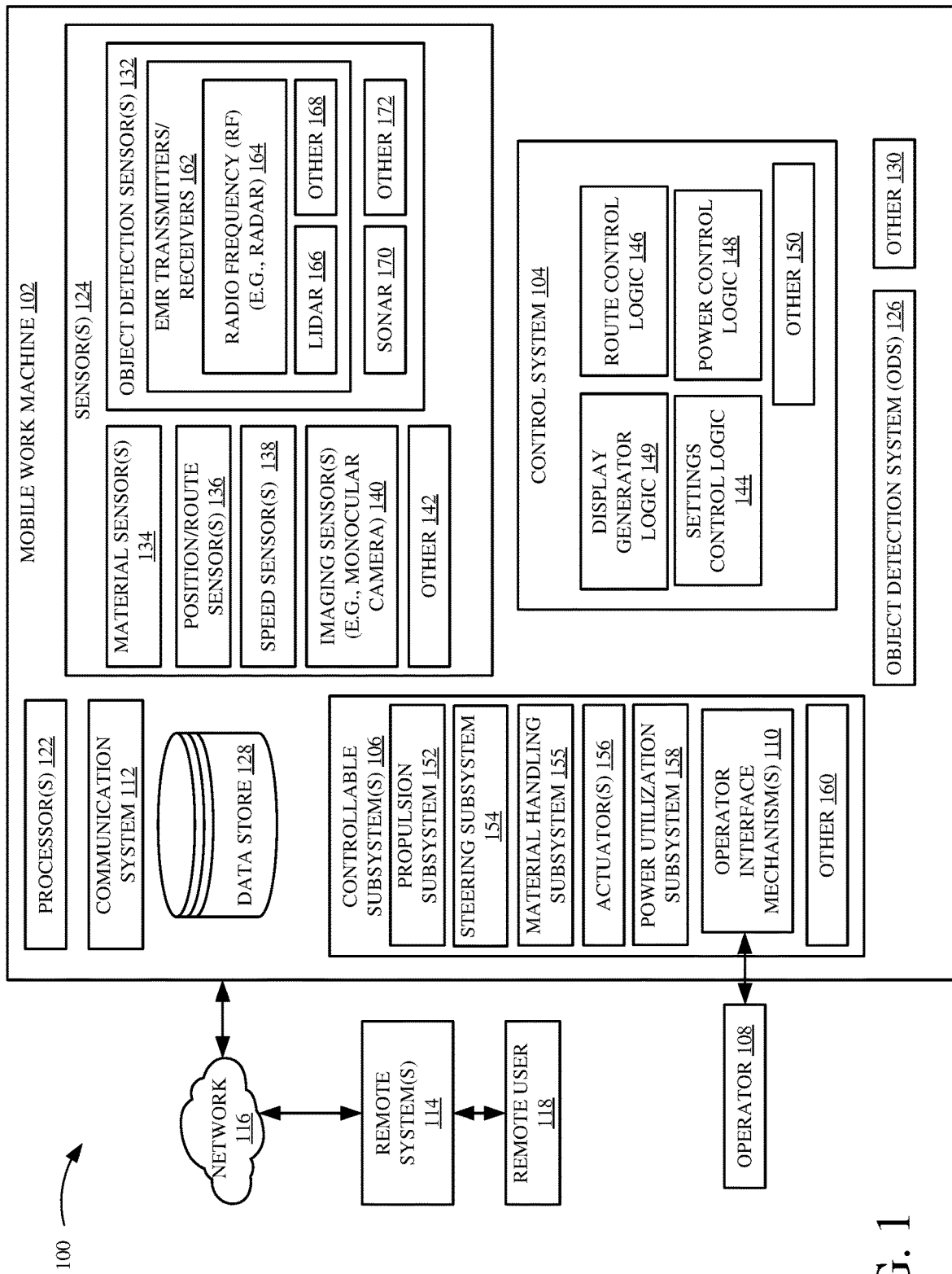
FIG. 1 is a block diagram showing one example of a work machine architecture that includes a mobile work machine.

FIG. 1 is a block diagram showing one example of a work machine architecture 100 that includes a mobile work machine 102. Work machine 102 includes a control system 104 configured to control a set of controllable subsystems 106 that perform operations on a worksite. For instance, an operator 108 can interact with and control work machine 102 through operator interface mechanism(s) 110. Operator interface mechanism(s) 110 can include such things as a steering wheel, pedals, levers, joysticks, buttons, dials, linkages, etc. In addition, they can include a display device that displays user actuatable elements, such as icons, links, buttons, etc. Where the device is a touch sensitive display, those user actuatable items can be actuated by touch gestures. Similarly, where mechanism(s) 110 includes speech processing mechanisms, then operator 108 can provide inputs and receive outputs through a microphone and speaker, respectively. Operator interface mechanism(s) 110 can include any of a wide variety of other audio, visual or haptic mechanisms.

Work machine 102 includes a communication system 112 configured to communicate with other systems or machines in architecture 100. For example, communication system 112 can communicate with other local machines, such as other machines operating on a same worksite as work machine 102. In the illustrated example, communication system 112 is configured to communicate with one or more remote systems 114 over a network 116. Network 116 can be any of a wide variety of different types of networks. For instance, it can be a wide area network, a local area network, a near field communication network, a cellular communication network, or any of a wide variety of other networks, or combinations of networks.

A remote user 118 is illustrated as interacting with remote system 114, such as to receive communications from or send communications to work machine 102 through communication system 112. For example, but not by limitation, remote user 118 can receive communications, such as notifications, requests for assistance, etc., from work machine 102 on a mobile device.

FIG. 1 also shows that work machine 102 includes one or more processors 122, one or more sensors 124, an object detection system 126, a data store 128, and can include other items 130 as well. Sensor(s) 124 can include any of a wide variety of sensors depending on the type of work machine 102. For instance, sensors 124 can include object detection sensor(s) 132, material sensors 134, position/route sensors 136, speed sensors 138, worksite imaging sensors 140, and can include other sensors 142 as well.

Material sensors 134 are configured to sense material being moved, processed, or otherwise worked on by work machine 102. Speed sensors 138 are configured to output a signal indicative of a speed of work machine 102.

Position/route sensors 136 are configured to identify a position of work machine 102 and a corresponding route (e.g., heading) of work machine 102 as it traverses the worksite. Sensors 136 include sensors configured to generate signals indicative of an angle or turn radius of machine 102. This can include, but is not limited to, steering angle sensors, articulation angle sensors, wheel speed sensors, differential drive signals, gyroscopes, to name a few.

Worksite imaging sensors 140 are configured to obtain images of the worksite, which can be processed to identify objects or conditions of the worksite. Examples of imaging sensor(s) 140 include, but are not limited to, a camera (e.g., a monocular camera, stereo camera, etc.) that obtains still images, a time-series of images, and/or video feed of an area of a worksite. For instance, the field of view (FOV) of the camera includes an area of the worksite that is to the rear of machine 102, and which may not otherwise be visible to operator 108 while in the operator compartment or cab of machine 102.

Object detection sensors 132 can include electromagnetic radiation (EMR) transmitters and receivers (or transceiver(s)) 162. Examples of EMR transmitters/receivers include radio frequency (RF) devices 164 (such as RADAR), LIDAR devices 166, and can include other devices 168 as well. Object detection sensors 132 can also include sonar devices 170, and can include other devices 172 as well.

For sake of illustration, but not by limitation, examples will be discussed below in the context of RADAR. Of course, other types of detection sensors can be utilized in those examples as well.

Control system 104 can include settings control logic 144, route control logic 146, power control logic 148, display generator logic 149, and it can include other items 150. Controllable subsystems 106 can include propulsion subsystem 152, steering subsystem 154, material handling subsystem 155, one or more different actuators 156 that can be used to change machine settings, machine configuration, etc., power utilization subsystem 158, and it can include a wide variety of other systems 160, some of which are described below. In one example, controllable subsystems 106 include operator interface mechanism(s) 110, such as display devices, audio output devices, haptic feedback mechanisms, as well as input mechanisms. Examples are discussed in further detail below.

Settings control logic 144 can control one or more of subsystems 106 in order to change machine settings based upon objects, conditions, and/or characteristics of the worksite. By way of example, settings control logic 144 can actuate actuators 156 that change the operation of material handling subsystem 155, propulsion subsystem 152, and/or steering subsystem 154.

Route control logic 146 can control steering subsystem 154. By way of example, but not by limitation, if an object is detected by object detection system 126, route control logic 146 can control propulsion subsystem 152 and/or steering subsystem 154 to avoid the detected object.

Power control logic 148 generates control signals to control power utilization subsystem 158. For instance, it can allocate power to different subsystems, generally increase power utilization or decrease power utilization, etc. These are just examples and a wide variety of other control systems can be used to control other controllable subsystems in different ways as well.

Display generator logic 149 illustratively generates a control signal to control a display device, to generate a user interface display for operator 108. The display can be an interactive display with user input mechanisms for interaction by operator 108.

Object detection system 126 is configured to receive signals from object detection sensor(s) 132 and, based on those signals, detect objects proximate machine 102 on the worksite, such as in a rear path of machine 102. Object detection system 126 can therefore assist operator 108 in avoiding objects while backing up. Before discussing object detection system 126 in further detail, an example of a mobile work machine will be discussed with respect to FIG. 2.

Figure 2:
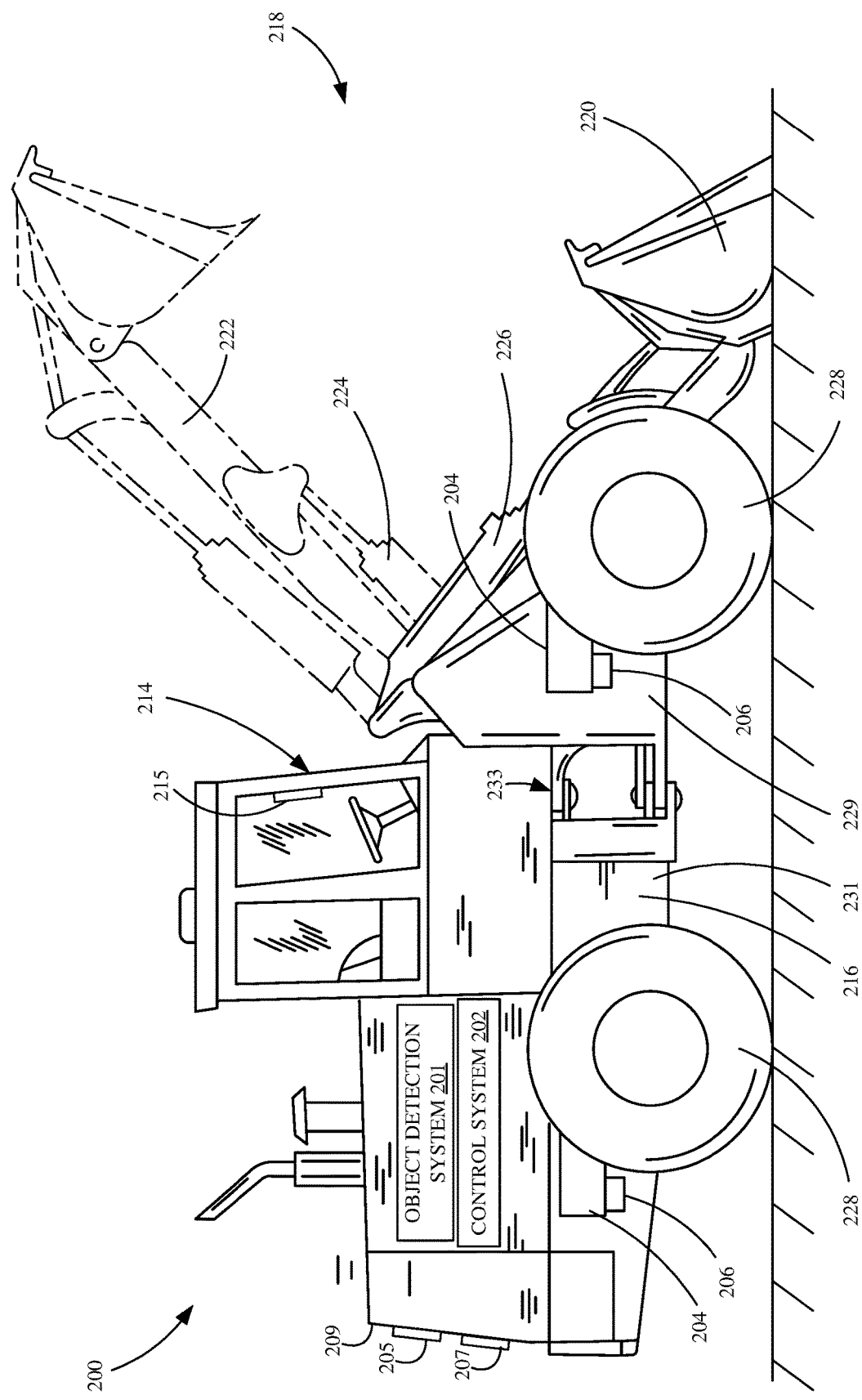
FIG. 2 is a pictorial illustration showing one example of a mobile work machine.

As noted above, mobile work machines can take a wide variety of different forms. FIG. 2 is a pictorial illustration showing one example of a mobile work machine 200, in the form of an off-road construction vehicle, with an object detection system 201 (e.g., system 126) and a control system 202 (e.g., 104). While machine 200 illustratively comprises a wheel loader, a wide variety of other mobile work machines may be used as well. This can include other construction machines (e.g., bull dozers, motor graders, etc.), agricultural machines (e.g., tractor, combine, etc.), to name a few.

Machine 200 includes a cab 214 having a display device 215, ground-engaging element(s) 228 (e.g., wheels), motor(s) 204, speed sensor(s) 206, a frame 216, and a boom assembly 218. Boom assembly 218 includes a boom 222, a boom cylinder 224, a bucket 220 and a bucket cylinder 226. Boom 222 is pivotally coupled to frame 216 and may be raised and lowered by extending or retracting boom cylinder 224. Bucket 220 is pivotally coupled to boom 222 and may be moved through an extension or retraction of bucket cylinder 226. During operation, mobile machine 200 can be controlled by an operator within cab 214 in which mobile machine 200 can traverse a worksite. In one example, each one of motor(s) 204 are illustratively coupled to, and configured to drive, wheel(s) 228 of mobile machine 200. Speed sensor(s) 206 are illustratively coupled to each one of motor(s) 204 to detect a motor operating speed.

In the illustrated example, machine 200 comprises an articulating body where a front portion 229 is pivotably connected to a rear portion 231 at a pivot joint 233. An articulation sensor can be utilized to determine the articulation angle, at pivot joint 233, which can be used to determine the path of machine 200. In another example in which the body of machine 200 is non-articulating, the angle of the front and/or rear wheels 228 is rotatable relative to the frame.

Object detection system 201 detects objects located within a range of machine 200. In the illustrated example, system 201 receives signals from object detection sensor(s) 205 and from imaging sensor(s) 207 (e.g., a monocular camera) which are illustratively mounted at a rear end 209 of machine 200. The components of system 201 and/or system 202 communicate over a CAN network of machine 200, in one example.

Object detection sensor(s) 205 are configured to send a detection signal from rear end 209 of machine 200 and receives reflections of the detection signal to detect one or more objects behind machine 200. In one example, the detection signal comprises electromagnetic radiation transmitted to the rear of machine 200. For instance, this can include radio frequency (RF) signals. Some particular examples include radar and LORAN, to name a few.

In other examples, object detection sensor(s) 205 utilize sonar, ultrasound, as well as light (e.g., LIDAR) to image objects. Example LIDAR systems utilize ultraviolet light, visible light, and/or near infrared light to image objects.

Of course, other types of object detectors can be utilized. In any case, object detection system 201 generates outputs indicative of objects, which can be utilized by control system 202 to control operation of machine 200.

Some work machines utilize a backup camera which displays a rear view from the machine to the operator, along with a radar system that provides audible indications on the presence of an object behind the machine. Such a system visually covers the area directly behind the machine that cannot be seen by the operator using mirrors. However, it is often difficult for the operator to determine what objects are relevant (e.g., actual obstacles versus non-obstacles or false positive object detections), and there is no indication of where the objects are actually located around the machine (e.g., whether they are in the machine path). For instance, some radar systems have a large range, but have a tendency to generate false positive alerts, that is an alert when there is no object present. Often, this is due to either a multi-path reflection or a ground reflection. Thus, it can be difficult for the operator to distinguish true positive alerts from false alerts. Also, some radar systems may detect objects at a far distance behind the machine, but may fail to detect objects that are in close proximity to the sensor (i.e., close to the rear end 209 of machine 200).

Further yet, some machine systems that utilize CAN communication may have limited bandwidth to communicate over the CAN bus. Thus, a signal received from a radar object detection system may include limited information regarding the tracked object, providing low quality information. Accordingly, the system is unable to determine size information, or range/angular resolution, increasing the likelihood of false positive detections.

Figure 3:
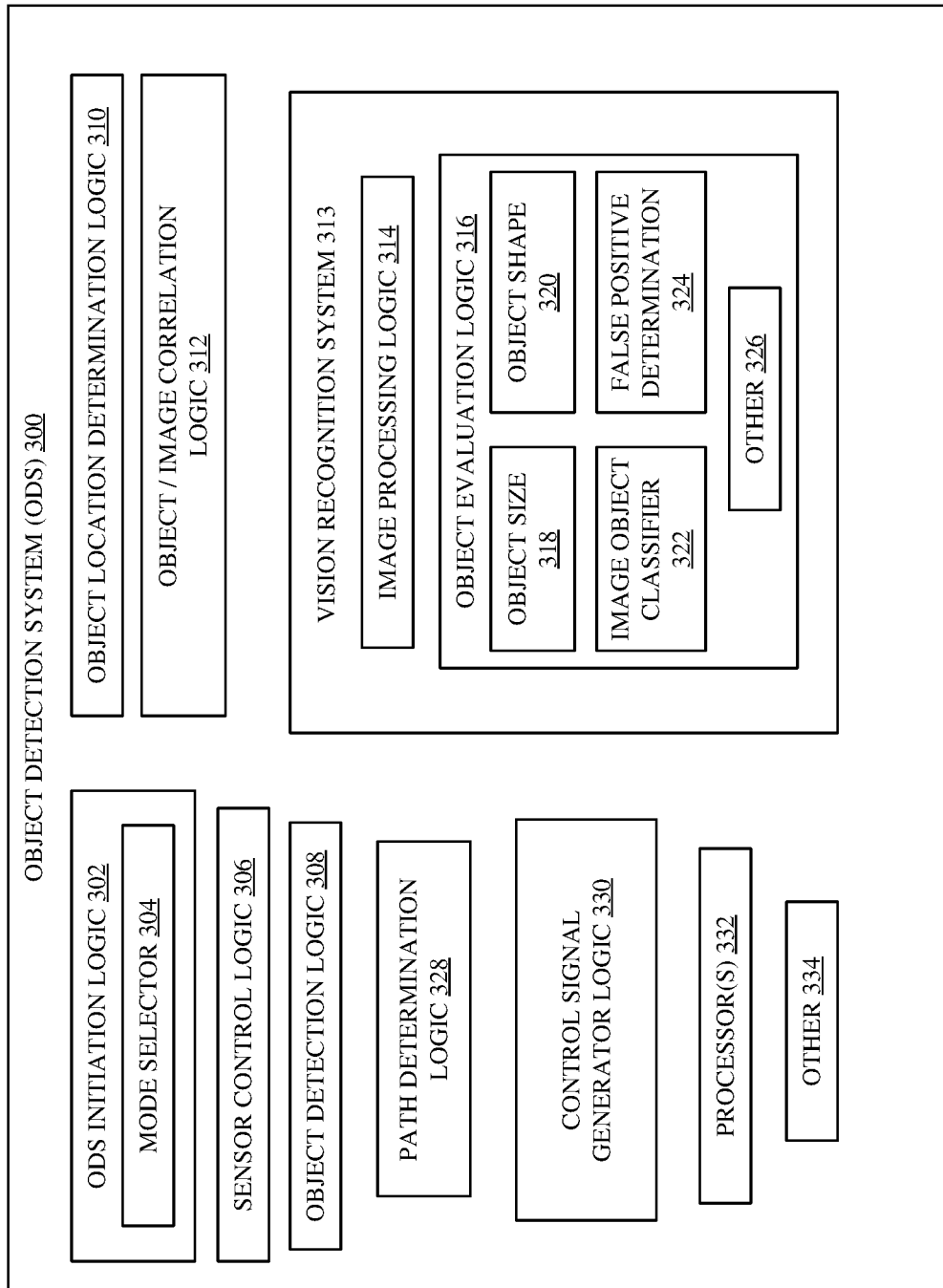
FIG. 3 is a block diagram illustrating one example of an object detection system.

FIG. 3 illustrates one example of an object detection system 300. System 300 is configured to combine object detection information, received from object detection sensors (such as sensors 132) with vision recognition, that uses images captured by imaging sensors on, or otherwise associated with, the machine. Accordingly, instead of just providing the operator the ability to see behind the machine, system 300 leverages the images as a sensor to detect objects, and their respective locations, relative to the work machine. Also, the objects detected by object detection system 300 can be fused with the images acquired by the imaging sensors, in order to provide the operator an indication of where in the image frames the detected objects are located. This can enable the operator to quickly determine whether a detected object is a false positive, a true positive that the operator is already aware of, or a true positive that the operator was not aware of. Also, system 300 facilitates a wider coverage area for object detection without significantly increasing the detection of false positives.

For sake of illustration, but not by limitation, object detection system 300 will be described in the context of mobile work machine 102 illustrated in FIG. 1.

System 300 includes initiation logic 302 configured to initiate and control object detection performed by system 300. For example, this can be in response to a mode selector 304 determining that the machine 102 has entered a particular mode for which system 300 is to be initiated. For example, this can be in response to determining that machine 102 is backing up, or is preparing to back up, etc., by sensing operator inputs and/or machine settings.

Sensor control logic 306 is configured to control object detection sensors 132 and imaging sensors 140. Logic 306 controls sensors 132 to transmit detection signals and to receive corresponding reflections of the detection signal, which is used by object detection logic 308 to detect the presence of objects on the worksite. Logic 306 controls sensors 140 to acquire images of the worksite.

Object location determination logic 310 is configured to determine a location of the object(s) detected by logic 308. Object/image correlation logic 312 is configured to correlate the object location determined by logic 310 with a portion of an image captured by imaging sensor 140.

Vision recognition system 313 is configured to perform vision recognition on the images, to evaluate the objects detected by logic 308. Illustratively, system 313 includes image processing logic 314 is configured to perform image processing on the image and object evaluation logic 316 is configured to evaluate the object based on the image processing performed by logic 314. This can include, but is not limited, object size detection 318, object shape detection 320, object classification performed by an object classifier 322, false positive determination 324, and can include other items 326 as well.

Path determination logic 328 is configured to determine a path of machine 102 and control signal generator logic 330 is configured to generate control signals, either by itself or in conjunction with control system 104. System 300 is illustrated as having one or more processors 332, and can include other items 334 as well.

Figure 4:
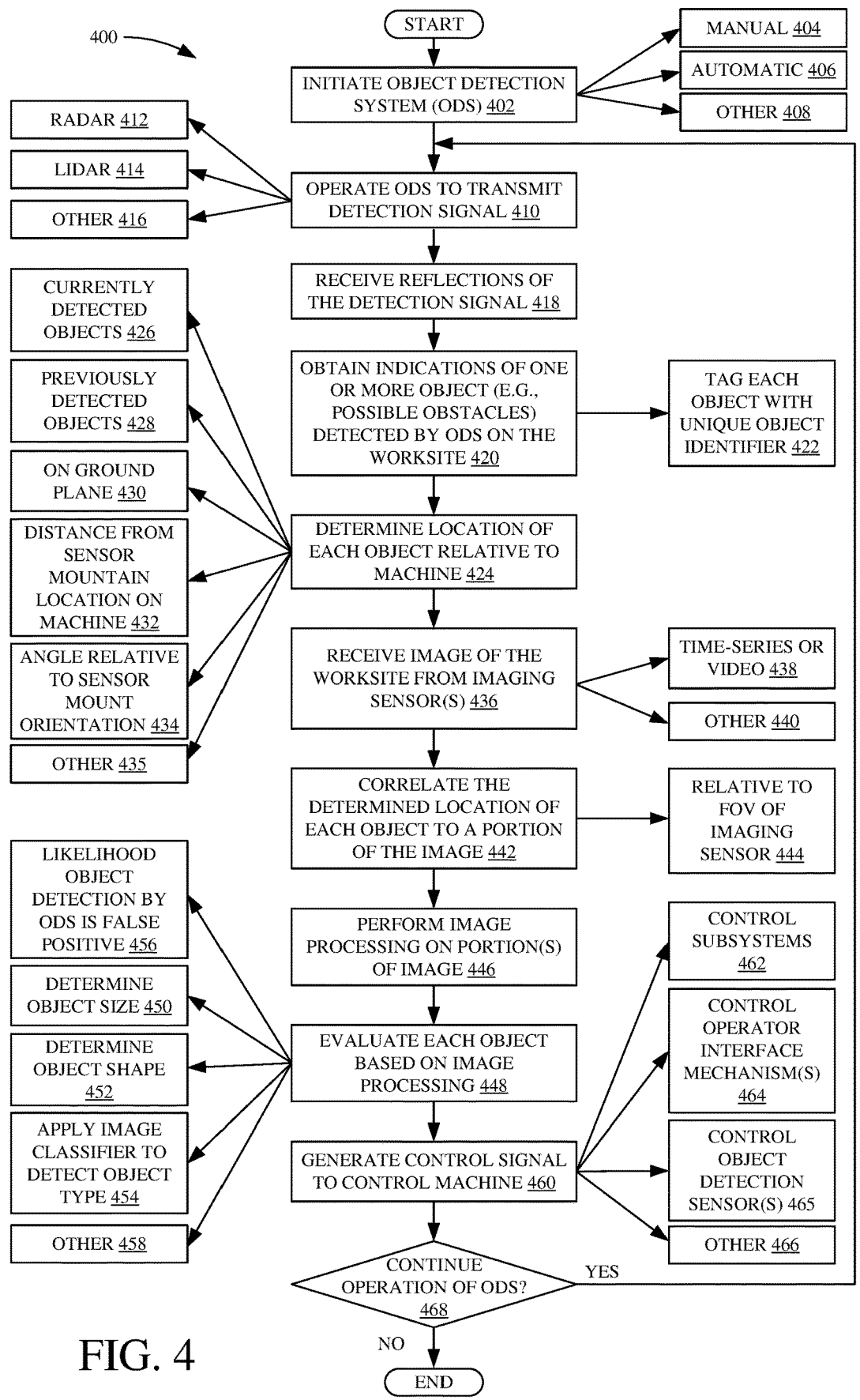
FIG. 4 is a flow diagram illustrating an example operation of an object detection system.

FIG. 4 illustrates a flow diagram 400 of an example operation of object detection system 300. For sake of illustration, but not by limitation, FIG. 4 will be described in the context of mobile work machine 102.

At block 402, initiation logic 302 initiates object detection. This can be in response to a manual input by operator 108, such as operator 108 actuating an input mechanism. This is represented by block 404. Alternatively, or in addition, the object detection system can be initiated automatically, such as in response to detection that machine 102 has entered a predetermined operating mode, such as being shifted into reverse. This is represented by block 406. Of course, the object detection system can be initiated in other ways as well. This is represented by block 408.

At block 410, sensor control logic 306 controls a transmitter to transmit a detection signal. In the illustrated example, this includes a radar transmitter transmitting a radar signal, represented by block 412. Alternatively, or in addition, the detection signal can comprise a LIDAR device

414, and can comprise other types of detection signals as well. This is represented by block 416.

At block 418, a receiver receives reflections of the detection signal transmitted at block 410. At block 420, based on the received reflections, object detection logic 308 obtains indications of one or more objects (e.g., representing possible obstacles on the worksite). Each of these objects can be tagged with a unique object identifier. This is represented by block 422. The unique object identifier can be utilized by system 300 for subsequent processing of the detected object.

At block 424, a location of each object relative to machine 102 is determined. This can include objects that are currently detected using the radar signal. This is represented by block 426. Also, the location of objects previously detected using the radar signal can also be determined. This is represented by block 428. For sake of illustration, it may be that object detection logic 308 detects a particular object at a first time but, as the machine traverses the worksite, system 300 no longer detects that particular object in the radar signal. As discussed in further detail below, these objects can still be tracked by system 300.

Determining the location of each object can comprise identifying the object's location on a ground plane, that is determining its approximate location at ground level of the worksite. This is represented by block 430.

In determining the location of each object, block 424 can use a distance from the sensor mounting location on work machine 102, that is an estimated distance of the object from the radar sensor. This is represented by block 432. Alternatively, or in addition, determining the location at block 424 can include determining an angle that the detected reflection is received relative to an orientation of the sensor mounted on machine 102. This is represented by block 434.

At block 436, image(s) of the worksite are received from imaging sensor(s) 140. As noted above, one example of imaging sensor 140 is a monocular camera. The image(s) received at block 436 can comprise a time series of images or video. This is represented by block 438. Of course, the image can be received in other ways as well. This is represented by block 440.

At block 442, the location of each object, determined at block 424, is correlated to a portion of the image received at block 436. Illustratively, this correlation is relative to the field of view of the imaging sensor. This is represented by block 444. For example, block 442 utilizes the angle and/or distance determined at blocks 432 and 434, to identify an area of the field of view of the imaging sensor that corresponds to the detected object.

At block 446, image processing is performed on the portion of the image, correlated to each object from block 442. At block 448, each of the detected objects are evaluated based on the image processing performed at block 446. This can include, but is not limited to, determining an object size (block 450), determining an object shape (block 452) and/or applying an image classifier to detect an object type (block 454). For example, image classification can determine that the object represented in the portion of the image is a person, another machine, or other type of object. These, of course, are for sake of example only.

Also, at block 448 false positive determination logic 324 can determine a likelihood that the detected object is a false positive. This is represented by block 456. In one example, this includes generating a metric or score indicative of a likelihood that the portion of the image represents an actual object on the worksite, and then comparing that metric or score to a threshold. Based on the comparison, logic 324 determines that the object detected from the radar signal is likely a false positive. Of course, the evaluation can be performed in other ways as well. This is represented by block 458.

At block 460, a control signal is generated to control machine 102 based on the evaluation of the object(s), performed at block 448. Machine 102 can be controlled in any of a number of ways. In one example, one or more of controllable subsystems 106 are controlled by control signal generator logic 330 and/or control system 104. This is represented by block 462. Alternatively, or in addition, operator interface mechanism(s) can be controlled to render visual, audio, haptic, or other types of outputs to operator 108, indicative of the detected objects. This is represented by block 464.

In one example, the object detection sensor(s) are controlled. This is represented by block 465. For example, settings of the radar transmitter can be adjusted. In another example, in which LIDAR (or other similar transmitter) is utilized, the control signal can control the transmitter to steer or direct the beam toward an area of worksite to perform another (e.g., higher accuracy) scan to identify possible objects.

Of course, machine 104 can be controlled in other ways as well. This is represented by block 466. At block 468, if the operation of object detection system 300 is continued, operation returns to block 410.

Figure 5A:
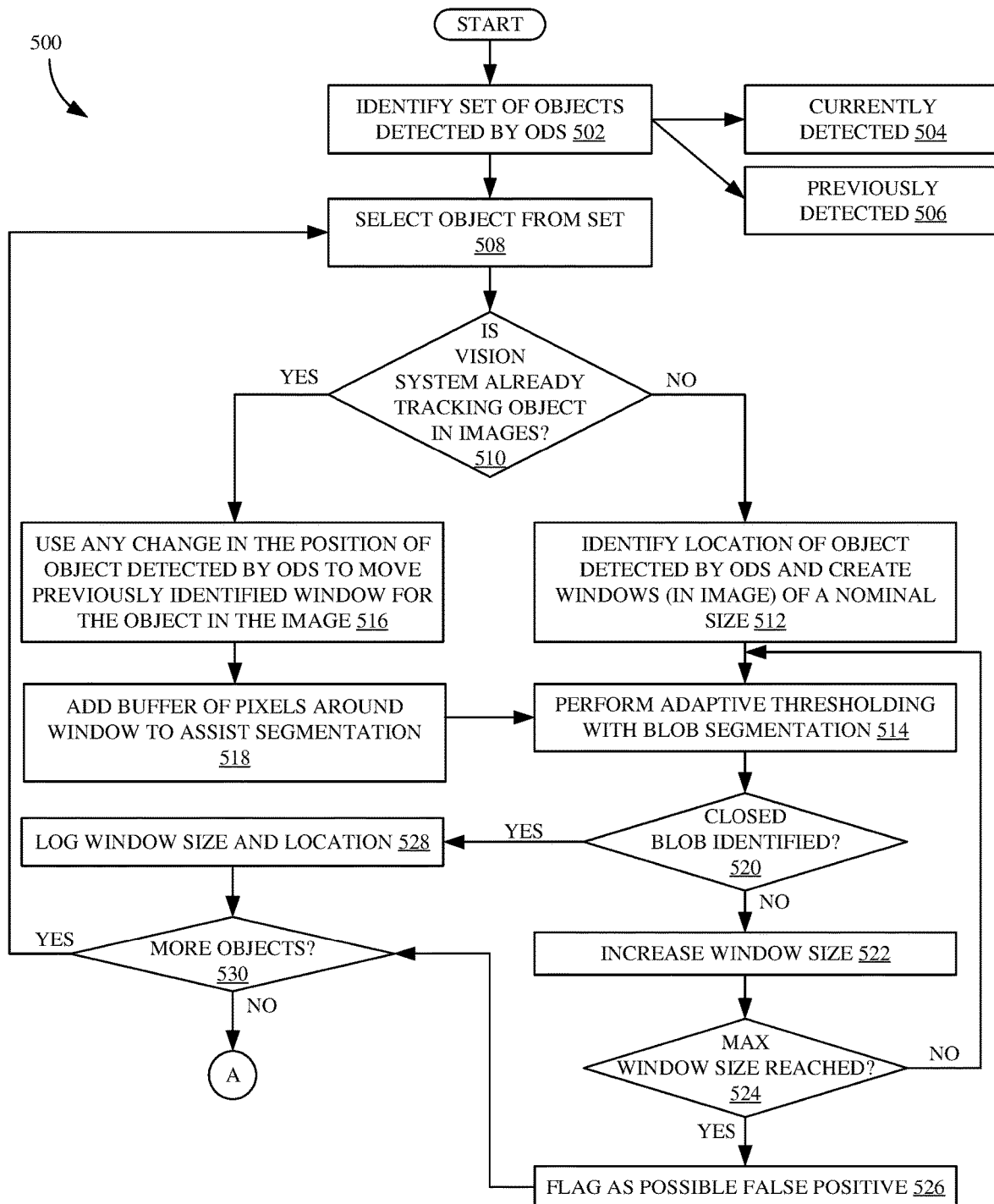
FIGS. 5A and 5B are a flow diagram illustrating an example operation of an object detection system.
Figure 5B:
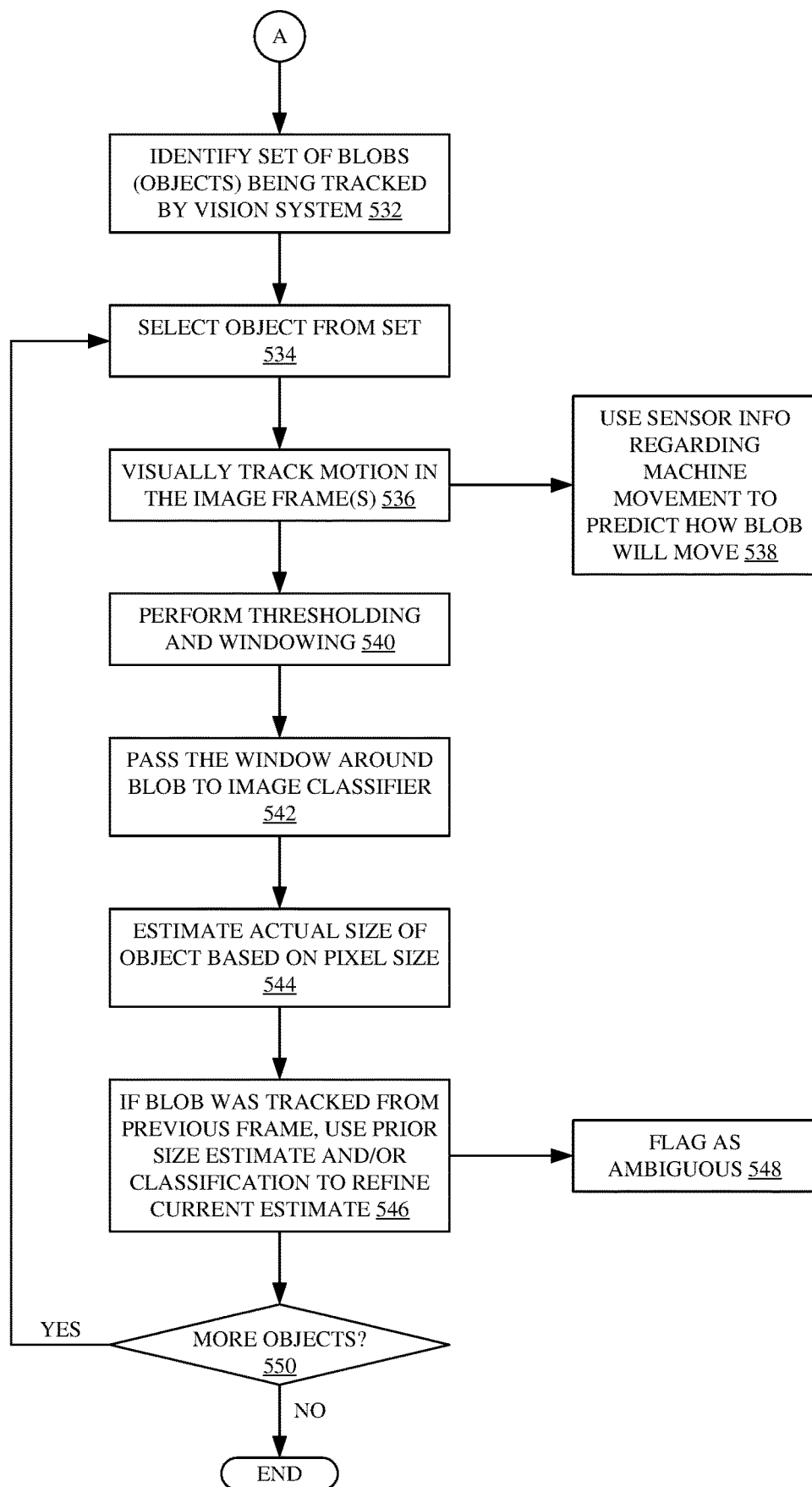

FIGS. 5A and 5B (collectively referred to as FIG. 5) illustrates a flow diagram 500 of an example operation of system 300 in evaluating objects using image processing. For sake of illustration, but not by limitation, FIG. 5 will be described in the context of mobile work machine 102.

At block 502, a set of objects detected by object detection logic 308, using object detection sensor(s) 132 (e.g., radar) are identified. In the illustrated example, this includes the objects and their respective locations from block 424 in FIG. 4. As noted above, the objects can include objects that are currently detected by object detection sensors 132 (block 504), as well as objects that were previously detected (block 506) but may not be currently detected.

At block 508, one of the objects from the set is selected for processing. Block 510 determines whether the selected object is already being tracked by image processing logic 314. If not, block 512 identifies the location of the object (as detected by object detection logic 308), and creates a window in the image having a nominal window size. The nominal window size is illustratively a first, pre-defined size to begin vision tracking of the object.

At block 514, image processing logic 314 performs adaptive thresholding with blob segmentation to separate objects from the background within the window. Thresholding is used to segment the image by setting all pixels whose intensity values are above a threshold to a foreground value and all the remaining pixels to a background value. In adaptive thresholding, the threshold is dynamically changed over the image, which can accommodate changes in lighting conditions in the image (e.g., caused by illumination gradients or shadows).

In one example, semantic image segmentation analyzes the portion of the image within the window to associate pixels or groups of pixels with a class label. The class label can be utilized to determine whether the pixels represent an object, or a non-object area of the worksite.

Referring again to block 510, if the object is already tracked by image processing logic 314, logic 314 uses any change in the position of the object, as detected by object detection logic 308 and determined by location determination logic 312, to move the previously identified window for the object within the image.

At block 518, a buffer of pixels can be added around the window to assist in blob segmentation at block 514. At block 520, image processing logic 314 determines whether a closed blob (e.g., a group of pixels representing a particular object class) is identified. If a closed blob is not identified, this may indicate that a portion of the object extends outside the current window. At block 522, image processing logic 314 increases the window size. If a maximum window size (which can be predetermined, or determined otherwise) is reached at block 524, the object is flagged as a possible false positive at block 526, by false positive determination logic 324.

If a closed blob is identified at block 520, the window size and location of the object is logged at block 528. At block 530, blocks 508/530 are repeated for any additional objects. At block 532, the set of blobs, or objects, that are tracked by image processing logic 314 are identified. One of the objects in the set is selected at block 534, and block 536 visually tracks the motion of that object in the image frames. For instance, block 536 determines a difference in location of the object between subsequent image frames. This can include use of sensor information regarding machine movement to predict how the object is likely to move between frames. This is represented by block 538.

At block 540, a window for the blob is determined. In one example, this is similar to the process described above with respect to blocks 510-530. At block 542, the window around the blob is passed to image object classifier 322 to perform image classification. This can include detecting a type of object represented within the window in the image.

At block 544, the actual size of the object is estimated based on the size of the pixels representing the object in the window. In one example, if the blob was tracked in a previous frame, a prior size estimate and/or prior classification is utilized to refine the current estimate of the object size and/or classification. This is represented by block 536. In one example, if the difference in the estimate between the current frame and the previous frame exceeds a threshold, the object can be flagged as ambiguous at block 548. Block 550 determines whether there are any more objects in the set.

Figure 6:
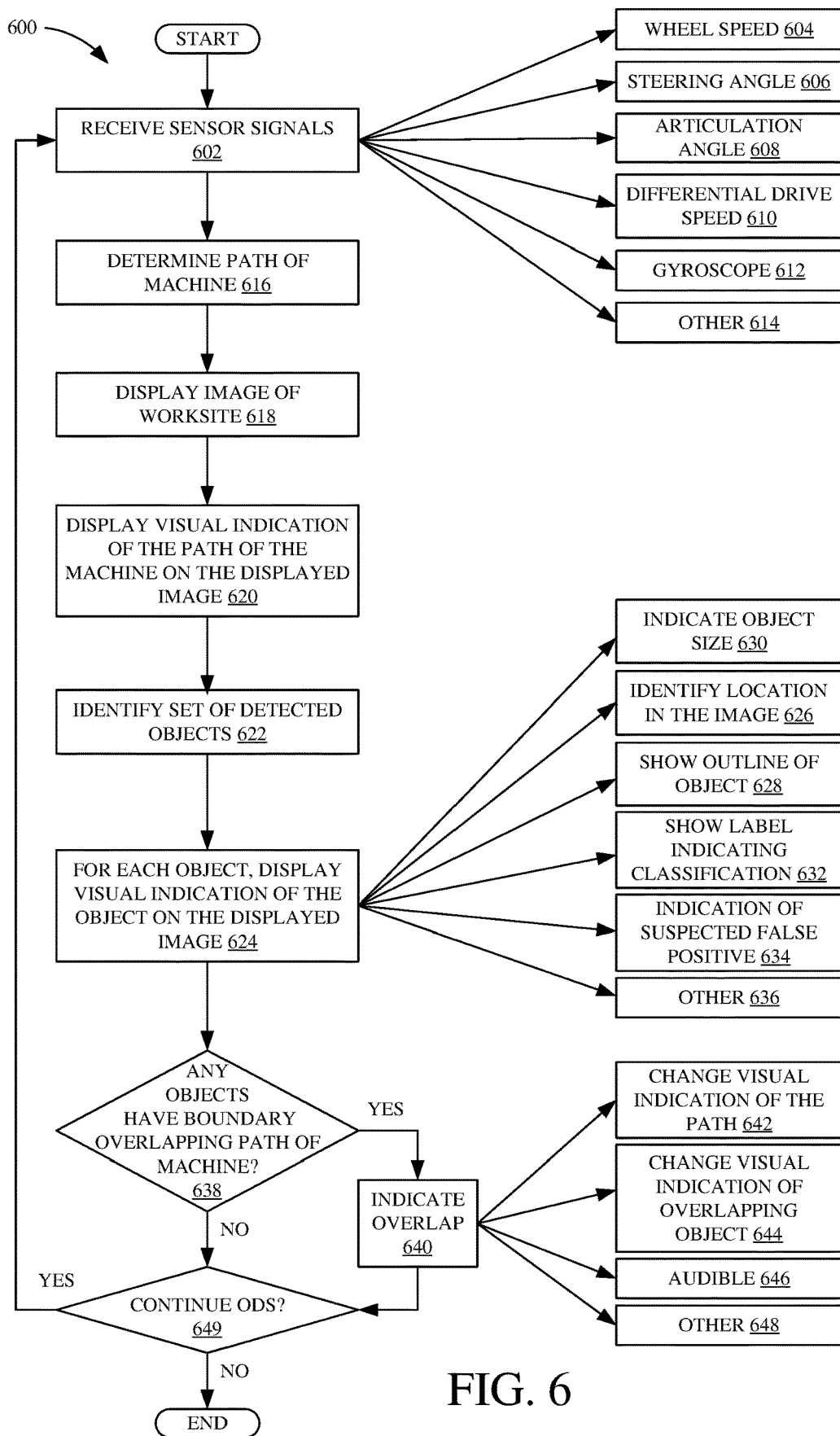
FIG. 6 is a flow diagram illustrating an example operation of path determination and control signal generation.

FIG. 6 is a flow diagram 600 illustrating an example operation of path determination logic 328 and control signal generator logic 330, in generating control signals for controlling a display device on, or otherwise associated with, machine 102. For sake of illustration, but not by limitation, FIG. 6 will be described in the context of mobile work machine 102.

At block 602, sensor signals are received from sensor(s) 124. This can include signals indicative of wheel speed (604), steering angle (606), articulation angle (608), differential drive speed (610), a gyroscope (612), and can include other signals (614) as well.

Referring to the example shown in FIG. 2, steering angle 606 is indicative of an angle of the front and/or rear wheels relative to the frame of machine 200. Articulation angle 608 is indicative of the articulation angle between the front portion 228 and rear portion 231.

Differential drive speed 610 is indicative of a difference between drive speeds of traction elements on opposite sides of the machine. For example, in the case of skid steer machines, the differential drive speed indicates a difference in direction and/or speed of the wheels or tracks on the left side of the machine from the right side of the machine. The average of the two speeds gives a forward or aft speed. The radius of curvature of the path of the machine can be determined based on the velocity, or ground speed of the machine's wheels or tracks and the degrees/second that the machine is driving about the curve.

In any case, based on the sensor signals, a path of the machine is determined at block 616. At block 618, an image (such as a time series of images or video) is displayed to operator 108 using a display device on or otherwise associated with machine 102. At block 620, a visual indication of the path, determined at block 616, is displayed.

At block 622, a set of detected objects are identified. Illustratively, these objects include the objects detected using radar signals transmitted by sensors 132.

At block 624, for each of the detected objects, a visual indication of the object is displayed on the displayed image. This can be done in any of a number of ways. For instance, a location of the object can be identified in the image. This is represented by block 626. Alternatively, or in addition, an outline of the object can be shown on the image. This is represented by block 628.

The visual indication can also indicate a size of the object (block 630), and/or can include a label indicating the object classification (block 632). For example, a label can be displayed on the display proximate the object, indicating the type of object, such as a person, another machine, etc.

Also, the visual indication can include an indication of whether the object is a suspected false positive. This is represented by block 634. For example, if the likelihood that the detected object is an actual object on the worksite is below a threshold, the display can be modified to indicate this, such as by color-coding the area on the display or otherwise displaying an indication that the object may be a false positive. This allows the operator to visually inspect the area of the worksite to confirm whether an object is present. Of course, the visual indication can be displayed in other ways as well. This is represented by block 636.

At block 638, system 300 determines whether any of the objects have a boundary that overlaps (or is within a threshold distance) from the path of the machine, determined at block 616. If so, the overlap is indicated at block 640. This can include changing a visual indication of the path at block 642, changing a visual indication of the overlapping object at block 644, rendering an audible alert at block 646, or other indications (block 648).

Figure 7:
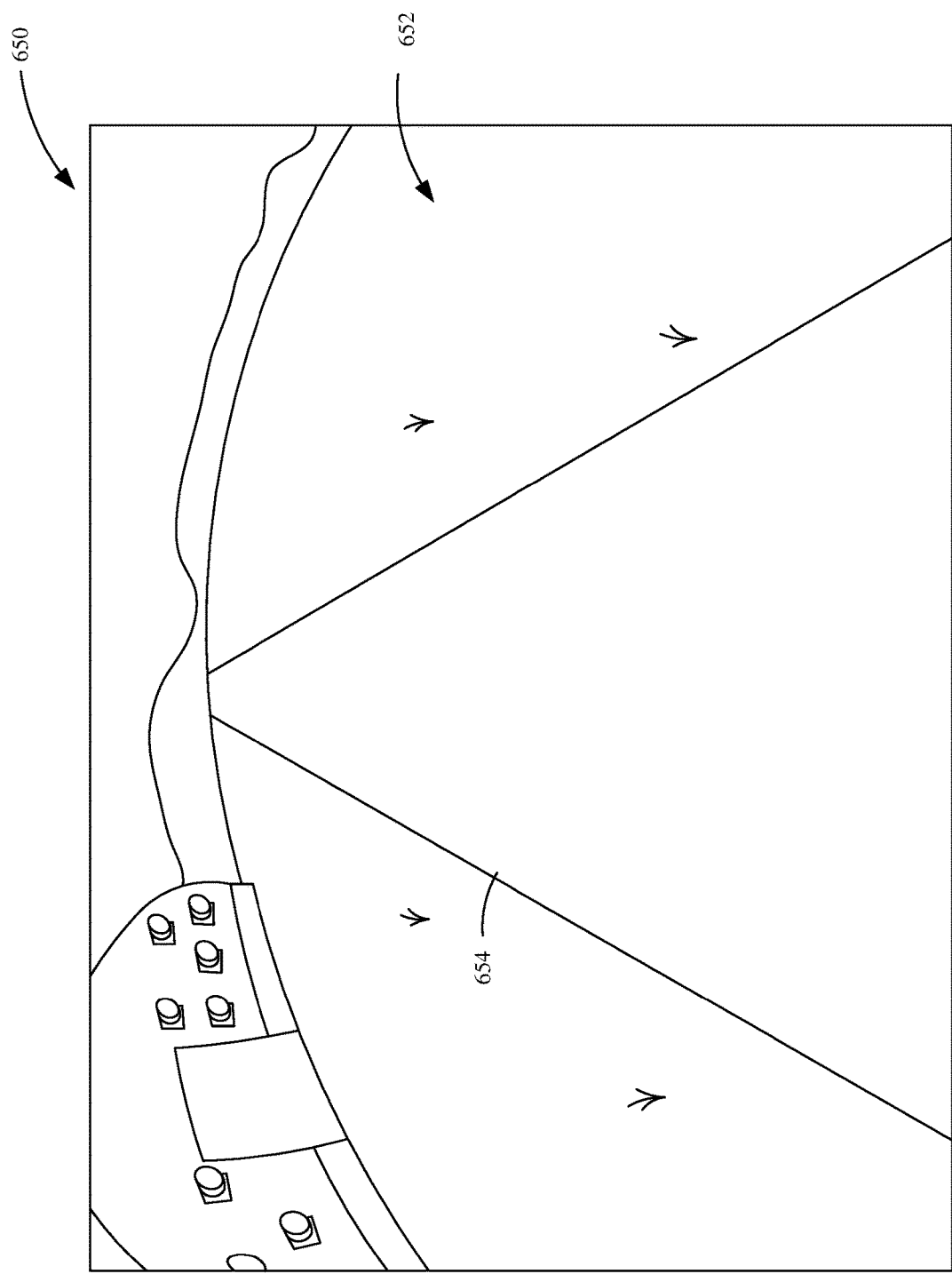
FIG. 7 is an example user interface display showing a path of a mobile work machine.
Figure 8:
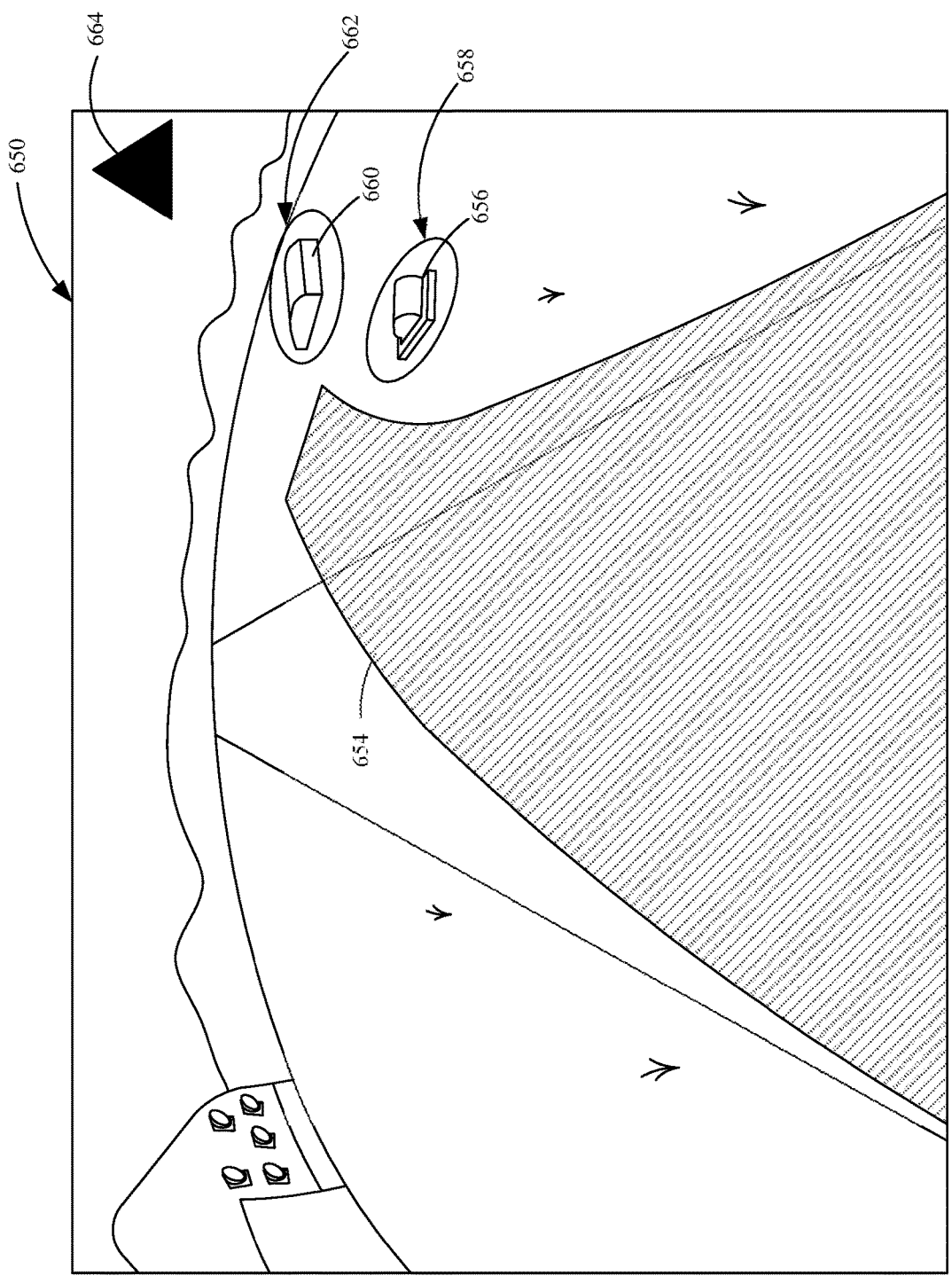
FIG. 8 is an example user interface display showing a path of a mobile work machine.
Figure 9:
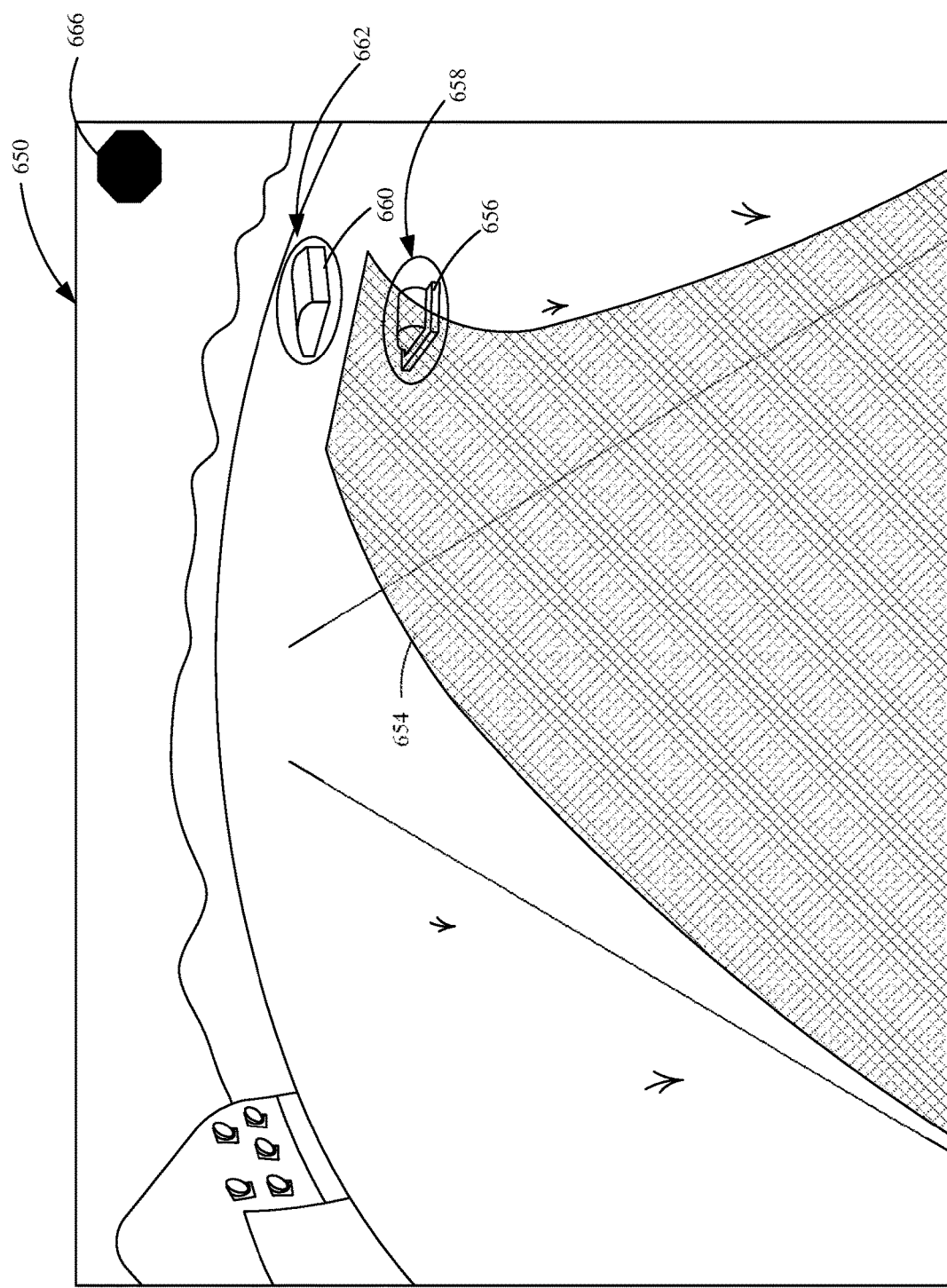
FIG. 9 is an example user interface display showing a path of a mobile work machine.

Example user interface displays are illustrated in FIGS. 7-9. For sake of illustration, but not by limitation, FIGS. 7-9 will be described in the context of mobile work machine 102.

FIG. 7 shows an example user interface display 650 that displays an image of a worksite 652 and a visual path indicator 654 representing the projected path of machine 102 on worksite 652. The field of view of imaging sensor 140 is to a rear of work machine 102. In FIG. 7, no objects have been detected on the worksite, or any objects that may have been detected are outside a threshold detection range. In any case, display 650 indicates that the path is clear of objects, for example by displaying visual path indicator 654 in a first state (i.e., clear, no shading or highlighting).

FIG. 8 shows user interface display 650 with a subsequent image frame obtained by imaging sensor 140 after operator 108 has begun backing work machine 102 while turning. Based on received sensor signals (e.g., received at block 602), system 126 determines the new projected path, which is represented by modifying visual path indicator 654. Here, system 126 has detected one or more objects 656 and 660 on the worksite and added visual object indicators 658 and 662, corresponding to the detected objects, on the display. Illustratively, indicators 658 and 662 increase a perceptibility of the detected objects 656 and 660. Indicators 658 and 662 can have any of a variety of display characteristics. For example, indicators 658 and 662 can flash on the display screen, can have a particular color (e.g., yellow), and/or can have a particular shape (e.g., a circle, an outline of the boundary of the object 656, etc.). Also, the display characteristic can vary based on the evaluation of the object detection performed by the vision recognition system. For instance, if the radar sensor detected an object, but the vision recognition system did not recognize an object at that location (or otherwise generated a low likelihood metric), a visual object indicator can be provided with a selected display characteristic (e.g., green) to indicate that the area of the image contains a likely false positive detection.

Display 650 also can be modified to indicate the location of the detected objects 656 and 660 relative to the path. In FIG. 8, system 126 determines that neither object 656 or 660 overlaps the projected path. Accordingly, visual path indicator 654 can be modified to indicate this, such as by changing a color (e.g., yellow) of visual path indicator 654. Alternatively, or in addition, a warning indicator 664 (e.g., a solid or blinking yellow triangle) can be added to the screen.

FIG. 9 shows user interface display 650 with a subsequent image frame obtained by imaging sensor 140 after operator 108 further backs work machine 102 on the worksite. At this point, system 126 determines that at least one of the objects 656 overlaps the projected path of machine 102. In response to the determination, display 650 is further modified to indicate the overlap. Illustratively, an alert level is raised by changing a display characteristic of visual path indicator 654. This can include changing the color (e.g., to red), causing indicator 654 to blink, to name few. Alternatively, or in addition, a different warning indicator 666 (e.g., a red stop sign) can be display. Further, as noted above, an icon, textual label, or other identifier can be added based on image classification. For example, a descriptive textual label can be added to display 650 proximate object indicator 658.

An audible warning can also be generated, and can change in volume (or otherwise) based on a detected distance to object 656 (i.e., the audible alarm becomes louder as machine 102 approaches object 656). Further yet, as noted above, the steering and/or propulsion subsystems can be automatically controlled to avoid contact with object 656 (e.g., by automatically breaking the wheels, stopping the engine, shifting gears, etc.).

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 10:
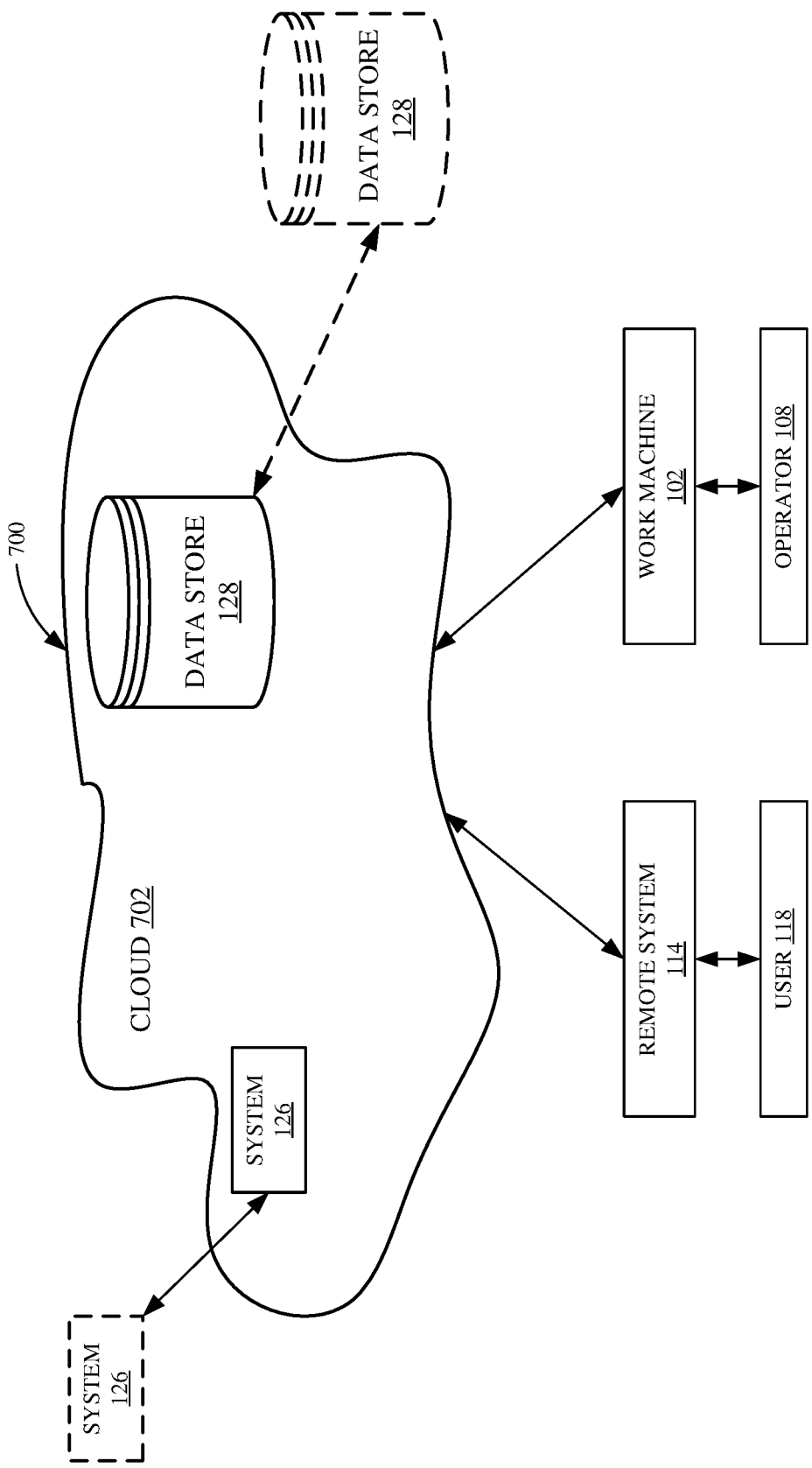
FIG. 10 is a block diagram showing one example of the architecture illustrated in FIG. 1, deployed in a remote server architecture.

FIG. 10 is a block diagram of one example of work machine architecture 100, shown in FIG. 1, where work machine 102 communicates with elements in a remote server architecture 700. In an example, remote server architecture 700 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 1 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 10, some items are similar to those shown in FIG. 1 and they are similarly numbered. FIG. 10 specifically shows that system 126 and data store 128 can be located at a remote server location 702. Therefore, work machine 102 accesses those systems through remote server location 702.

FIG. 10 also depicts another example of a remote server architecture. FIG. 10 shows that it is also contemplated that some elements of FIG. 1 are disposed at remote server location 702 while others are not. By way of example, data store 128 can be disposed at a location separate from location 702, and accessed through the remote server at location 702. Alternatively, or in addition, system 126 can be disposed at location(s) separate from location 702, and accessed through the remote server at location 702.

Regardless of where they are located, they can be accessed directly by work machine 102, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the work machine comes close to the fuel truck for fueling, the system automatically collects the information from the machine or transfers information to the machine using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the work machine until the work machine enters a covered location. The work machine, itself, can then send and receive the information to/from the main network.

It will also be noted that the elements of FIG. 1, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 11:
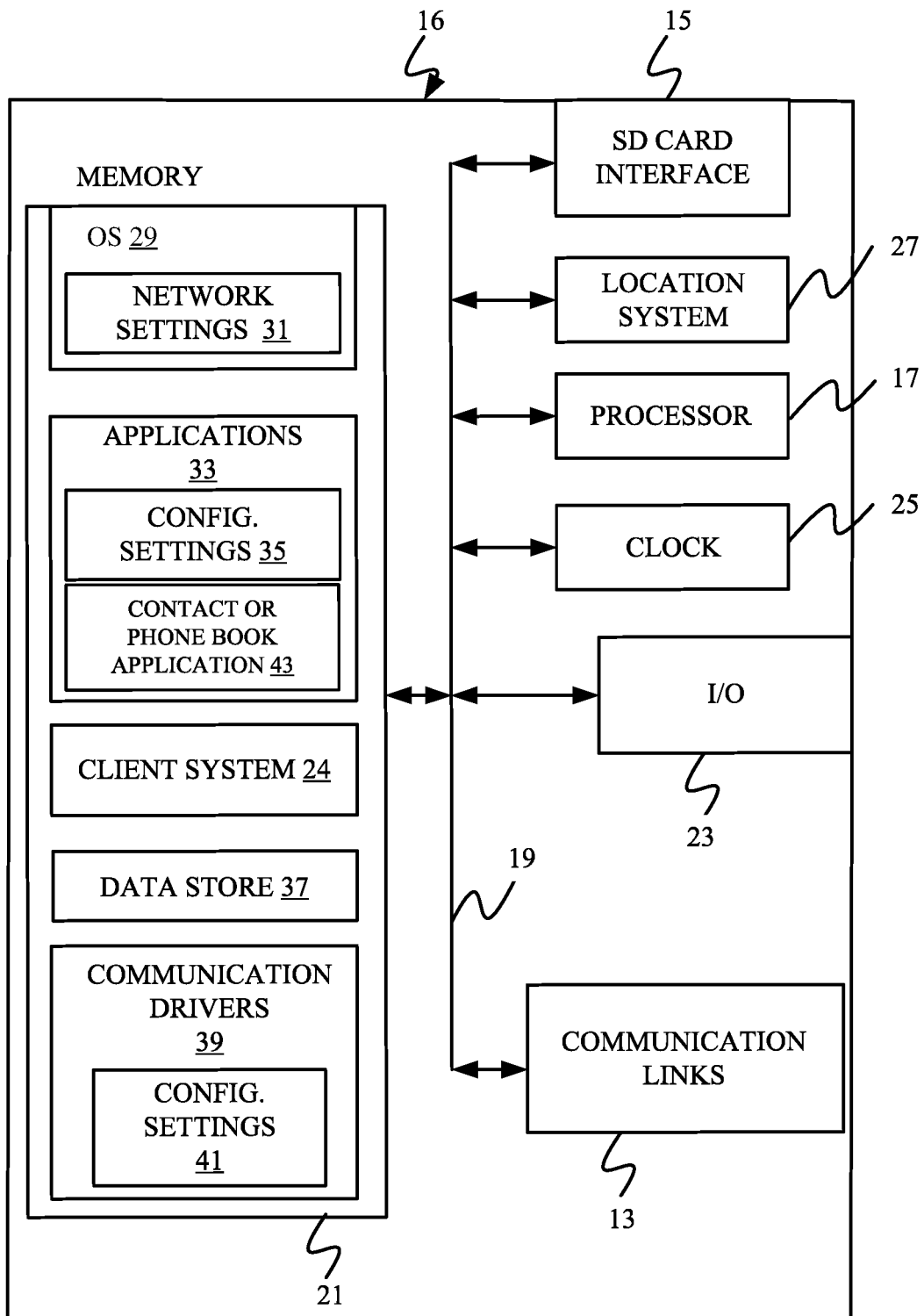
FIGS. 11-13 show examples of mobile devices that can be used in the architectures shown in the previous figures.
Figure 12:
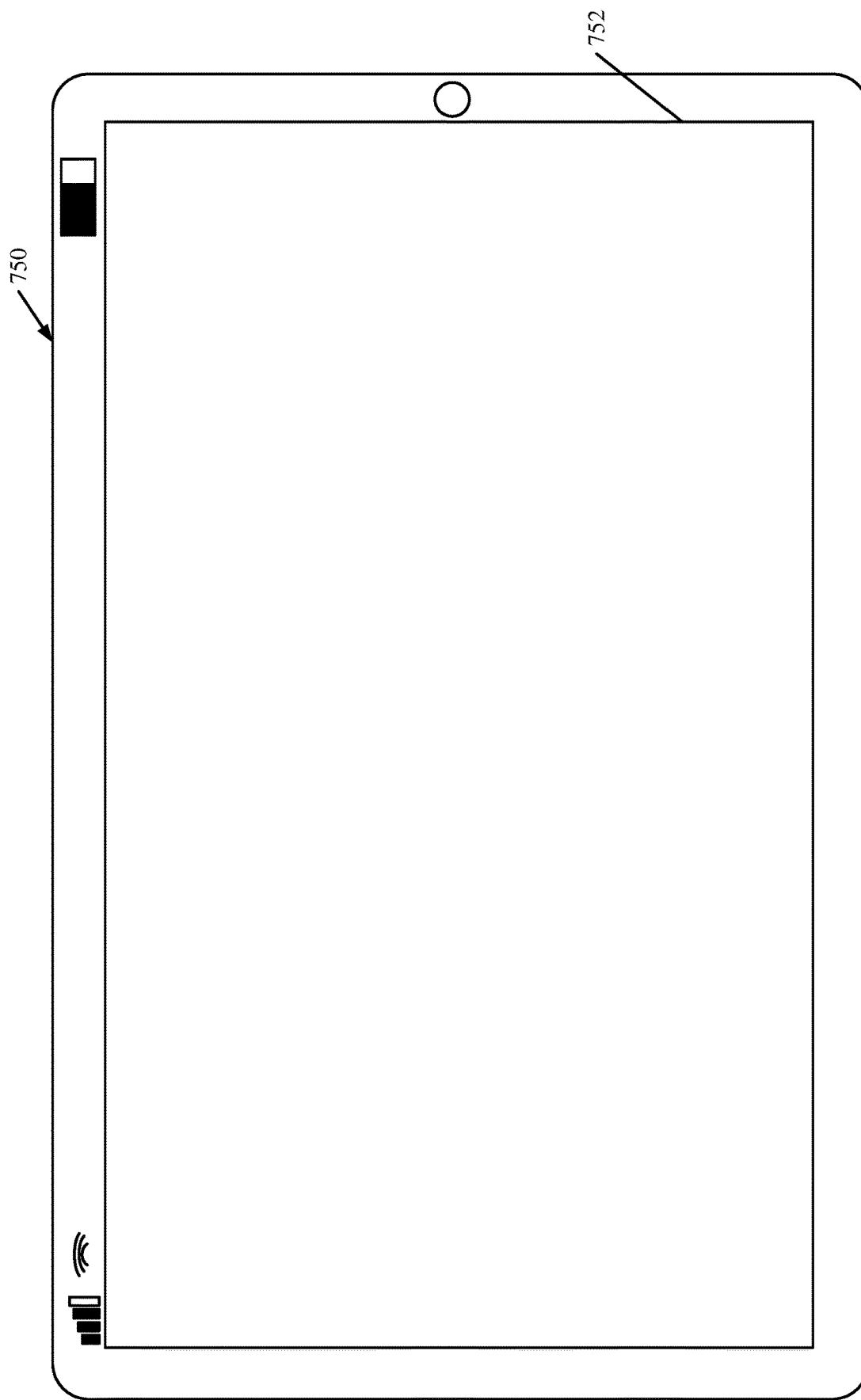
Figure 13:
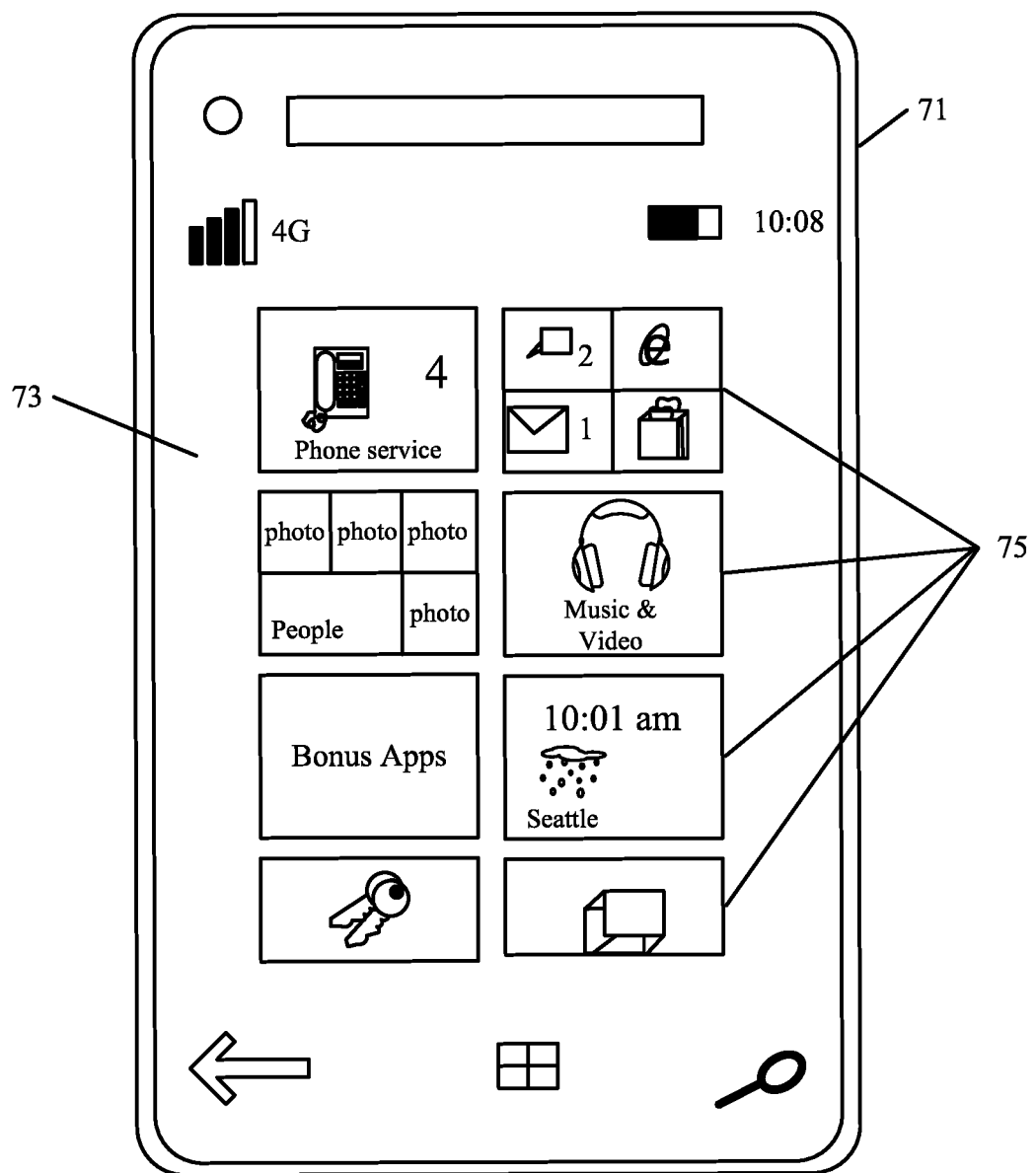

FIG. 11 is a simplified block diagram of one illustrative example of a handheld or mobile computing device that can be used as a user's or client's hand held device 16, in which the present system (or parts of it) can be deployed. For instance, a mobile device can be deployed in the operator compartment of work machine 102 or as remote system 114. FIGS. 12-13 are examples of handheld or mobile devices.

FIG. 11 provides a general block diagram of the components of a client device 16 that can run some components shown in FIG. 1, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 12 shows one example in which device 16 is a tablet computer 750. In FIG. 12, computer 750 is shown with user interface display screen 752. Screen 752 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 750 can also illustratively receive voice inputs as well.

FIG. 13 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 14:
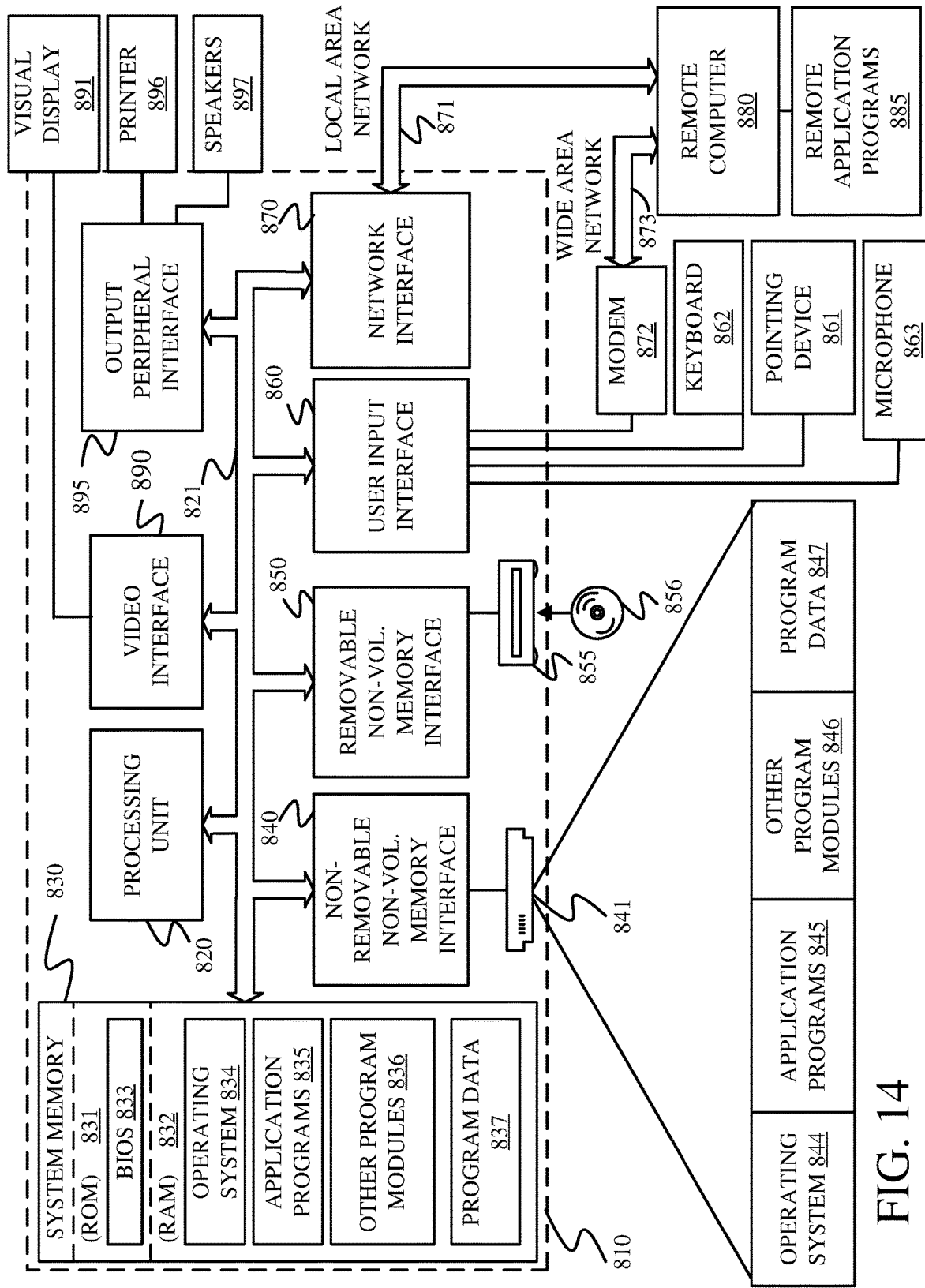
FIG. 14 is a block diagram showing one example of a computing environment that can be used in the architectures shown in the previous figures.

FIG. 14 is one example of a computing environment in which elements of FIG. 1, or parts of it, (for example) can be deployed. With reference to FIG. 14, an example system for implementing some embodiments includes a computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 14.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 14 illustrates operating system 834, application programs 835, other program modules 836, and program data 837.

The computer 810 may also include other removable/non-removable volatile/nonvolatile computer storage media. By way of example only, FIG. 14 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 is typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 14, provide storage of computer readable instructions, data structures, program modules and other data for the computer 810. In FIG. 14, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network—WAN or a controller area network—CAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 14 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a method of controlling a work machine on a worksite, the method comprising:
  receiving an indication of an object detected on the worksite;
  determining a location of the object relative to the mobile work machine;
  receiving an image of the worksite;
  correlating the determined location of the object to a portion of the image;
  evaluating the object by performing image processing of the portion of the image; and
  generating a control signal that controls the mobile work machine based on the evaluation.

Example 2 is the method of any or all previous examples, wherein receiving the indication of the object comprises:
  transmitting a detection signal;
  receiving reflections of the detection signal; and
  detecting the object based on the received reflections.

Example 3 is the method of any or all previous examples, wherein evaluating the object comprises determining a likelihood that the detection of the object comprises a false positive detection.

Example 4 is the method of any or all previous examples, wherein the detection signal comprises a radio frequency (RF) signal.

Example 5 is the method of any or all previous examples, wherein the RF signal comprises a radar signal.

Example 6 is the method of any or all previous examples, wherein the determined location of the object is correlated to a portion of the image based on a mounting location of the camera on the mobile work machine and a field of view of the camera.

Example 7 is the method of any or all previous examples, wherein receiving an image comprises receiving a time-series of images from a camera, and further comprising visually tracking a location of the object in a plurality of subsequently acquired images in the time-series.

Example 8 is the method of any or all previous examples, wherein the control signal controls a display device associated with the mobile work machine to display the image with a visual indication of a location of the object on the image.

Example 9 is the method of any or all previous examples, wherein evaluating the object comprises determining at least one of an object size or object shape, and further comprising generating the control signal based on the at least one of an object size or object shape.

Example 10 is the method of any or all previous examples, wherein performing image processing comprises applying an image classifier to the portion of the image to determine an object type of the object Example 11 is the method of any or all previous examples, and further comprising:
- determining a projected path of the mobile work machine;
- determining that at least a portion of the detected object is located in the projected path; and
- generating the control signal based on the determination Example 12 is a mobile work machine
- an object detection sensor configured to generate a signal indicative of an object detected on a worksite;
- object location determination logic configured to determine a location of the object relative to the mobile work machine;
- image correlation logic configured to receive an image of the worksite and correlate the determined location of the object to a portion of the image;
- image processing logic configured to perform image processing on the portion of the image;
- object evaluation logic configured to evaluate the object based on the image processing of the portion of the image; and
- control signal generator logic configured to generate a control signal that controls the mobile work machine based on the evaluation.

Example 13 is the mobile work machine of any or all previous examples, wherein the object detection sensor is configured to:
- transmit a detection signal;
- receive reflections of the detection signal; and
- generate the signal based on the received reflections.

Example 14 is the mobile work machine of any or all previous examples, wherein the detection signal comprises a radar signal.

Example 15 is the mobile work machine of any or all previous examples, wherein the image correlation logic is configured to correlate the determined location of the object to the portion of the image based on a mounting location of the camera on the mobile work machine and a field of view of the camera.

Example 16 is the mobile work machine of any or all previous examples, and further comprising an imaging sensor configured to generate a time-series of images of the worksite, and the image correlation logic is configured to visually track a location of the object in a plurality of subsequently acquired images in the time-series.

Example 17 is the mobile work machine of any or all previous examples, wherein the control signal controls a display device associated with the mobile work machine to display the image with a visual indication of a location of the object on the image.

Example 18 is the mobile work machine of any or all previous examples, and further comprising:
- path determination logic configured to determine a projected path of the mobile work machine; and
- the control signal generator logic is configured to determine that at least a portion of the detected object is located in the projected path, and generate the control signal based on the determination.

Example 19 is a mobile work machine comprising:
- a transmitter configured to transmit a radar signal;
- a receiver configured to receive reflections of the radar signal and generate an object detection signal indicative of an object detected on a worksite based on the received reflections;
- an object detection system configured to:
  - determine a location of the object relative to the mobile work machine;
  - receive an image of the worksite;
  - correlate the determined location of the object to a portion of the image;
  - evaluate the object by performing image processing of the portion of the image; and
- a control system configured to generate a control signal that controls the mobile work machine based on the evaluation.

Example 20 is the mobile work machine of any or all previous examples, wherein the object detection system is configured to:
- determine a projected path of the mobile work machine; and
- determine that at least a portion of the detected object is located in the projected path, and
- the control signal controls a display device associated with the mobile work machine to display the image with visual indications of the projected path and location of the object.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile work machine comprising:
   a set of ground engaging elements configured to convey the mobile work machine over a worksite;
   a controllable subsystem configured to perform a worksite operation;
   an object detection sensor at a sensor location, the object detection sensor configured to generate a first sensor signal indicative of presence of a potential object relative to the sensor location;
   an optical imaging sensor having a field of view, the optical imaging sensor configured to generate a second sensor signal representing an image of the worksite;
   at least one processor; and
   memory storing instructions executable by the at least one processor, wherein the instructions, when executed, cause the mobile work machine to:
   define a window within the field of view of the optical imaging sensor based on the first sensor signal indicative of presence of the potential object;
   after the window is defined based on the first sensor signal, perform image processing on the image by:
   performing blob segmentation that separates the potential object from an image background;
   iteratively increasing a window size for the window until a closed blob that represents the potential object is detected; and determining that a detected object is present based on the detection of the closed blob; and generate a control signal that controls the mobile work machine based on the detected object.

2. The mobile work machine of claim 1, wherein the instructions cause the mobile work machine to:
transmit a detection signal;
receive reflections of the detection signal; and
based on the reflections, generate the first sensor signal indicative of a position of the potential object relative to the sensor location.

3. The mobile work machine of claim 1, wherein the object detection sensor comprises a non-optical object detection sensor on the mobile work machine.

4. The mobile work machine of claim 2, wherein the detection signal comprises a radio frequency (RF) signal.

5. The mobile work machine of claim 2, wherein the instructions cause the mobile work machine to:
determine an angle of the reflections relative to a reference orientation;
determine a distance of the potential object from the sensor location based on the reflections;
identify a window position of the window based oil the angle and the distance.

6. The mobile work machine of claim 1, wherein the optical imaging sensor comprises a camera, and the instructions cause the mobile work machine to:
receive a time-series of images from the camera; and
perform vision tracking of the object by moving the window within the time-series of images based on one or more subsequent sensor signals from the object detection sensor indicative of a position of the potential object.

7. The mobile work machine of claim 6, wherein the instructions cause the mobile work machine to:
identify a first location of the window based on a first image in the time-series of images; and
modify the window to a second location based on a second image in the time-series of images.

8. The mobile work machine of claim 6, wherein the instructions cause the mobile work machine to:
set a first window size for the window based on a first image in the time-series of images and modify the window to have a. second window size based on a second image in the time-series images.

9. The mobile work machine of claim 1, wherein the instructions cause the mobile work machine to:
perform the image processing on the image to generate an object evaluation representing the potential object, the object evaluation indicating at least one of:
an object size of the potential object;
an object shape of the potential object; or
an object type of the potential object; and
control a display device associated with the mobile work machine to display the image with a visual indication of the object evaluation.

10. The mobile work machine of claim 8, wherein the instructions cause the mobile work machine to:
determine a projected path of the mobile work machine;
determine that at least a portion of the detected object is located in the projected path; and
control the controllable subsystem based on the determination that at least a portion of the detected object is located in the projected path.

11. A mobile work machine comprising:
a controllable subsystem configured to perform a machine operation on a worksite;
an object detection sensor comprising;
a transmitter configured to transmit an electromagnetic signal; and
a receiver configured to receive a reflection of the electromagnetic signal and to generate, based on the reflection, an object detection signal indicative of presence of a potential object;
an optical imaging sensor having a field of view and configured to generate an image signal representing an image corresponding to the field of view;
at least one processor; and
memory storing instructions executable by the at least one processor, wherein the instructions, when executed, cause the mobile work machine to:
identify a location within the image that corresponds to the potential object based on the object detection signal from the object detection sensor;
define a window having a window position at the location within the image;
perform image processing on a portion of the image to determine a window size for the window within which a closed blob that represents the potential object is identified;
determine a likelihood that detection of the potential object by the object detection sensor comprises a false positive detection based on the window size exceeding a threshold; and
generate a control signal that controls an action of the controllable subsystem based on the likelihood.

12. The mobile work machine of claim 11, wherein the object detection sensor comprises a non-optical object detection sensor.

13. The mobile work machine of claim 12, wherein the non-optical object detection sensor comprises a radar sensor.

14. The mobile work machine of claim 11, wherein the optical imaging sensor comprises a camera and the instructions cause the mobile work machine to correlate the location of the potential object to the portion of the image based on a mounting location of the camera on the mobile work machine and the field of view of the camera.

15. The mobile work machine of claim 11, and further comprising an imaging sensor configured to generate a time-series of images of the worksite, and the instructions cause the mobile work machine to visually track the location of the potential object in a plurality of subsequently acquired images in the time-series.

16. The mobile work machine of claim 11, wherein the control signal controls a display device associated with the mobile work machine to display the image with a visual indication of the location of the potential object on the image.

17. The mobile work machine of claim 11, wherein the instructions cause the mobile work machine to:
determine a projected path of the mobile work machine;
determine that at least a portion of the potential object is located in the projected path; and
generate the control signal based on the determination that at least a portion of the potential object is located in the projected path.

18. A mobile work machine comprising:
a controllable subsystem configured to perform a machine operation on a worksite;
a radar sensor comprising:
a transmitter configured to transmit a radar signal; and
a receiver configured to receive reflections of the radar signal and generate an object indication indicative of presence of a potential object on the worksite based on the reflections;

a camera having a field of view and configured to capture images with the field of view: and a control system comprising at least one processor and memory storing instructions executable by the at least one processor, wherein the instructions, when executed, cause the mobile work machine to:

based on the object indication from the radar sensor, identify a window having a window size and a window position within the field of view of the camera;

receive one or more images of the worksite captured by the camera;

evaluate the potential object by performing image processing, wherein the image processing comprises:

performing blob segmentation that separates the potential object from an image background;

iteratively increasing the window size until a closed blob is detected;

determining that a detected object is present based on the detection of the closed blob; and generate a control signal that controls the mobile work machine based on the detected object.

19. The mobile work machine of claim 17, wherein the instructions cause the mobile work machine to:

determine a projected path of the mobile work machine;

determine that at least a portion of the detected object is located in the projected path; and control a display device associated with the mobile work machine to display the with visual indications of the projected path and location of the detected object.

20. The mobile work machine of claim 8, wherein the instructions cause the mobile work machine to determine a likelihood that the detection of the potential object by the radar sensor comprises a false positive detection based on the window size reaching a threshold size.

\* \* \* \* \*